(12) United States Patent
Evans et al.

(10) Patent No.: US 10,415,740 B2
(45) Date of Patent: Sep. 17, 2019

(54) REMOVABLE MOTOR HOUSING FOR A PLANT MATERIAL TRIMMING DEVICE

(71) Applicant: KEIRTON INC., Surrey (CA)

(72) Inventors: Jay Evans, Surrey (CA); Aaron McKellar, Surrey (CA)

(73) Assignee: Keirton, Inc., Surry, British Columbia (CA)

( * ) Notice: Subject to any disclaimer, the term of this patent is extended or adjusted under 35 U.S.C. 154(b) by 0 days.

(21) Appl. No.: 16/018,912

(22) Filed: Jun. 26, 2018

(65) Prior Publication Data

US 2018/0306377 A1 Oct. 25, 2018

Related U.S. Application Data

(62) Division of application No. 14/438,422, filed as application No. PCT/CA2014/050338 on Apr. 24, 2015, now abandoned.

(30) Foreign Application Priority Data

Jul. 9, 2013 (CA) ...................................... 2820055

(51) Int. Cl.
*F16M 1/00* (2006.01)
*B26D 7/06* (2006.01)
(Continued)

(52) U.S. Cl.
CPC ................. *F16M 1/00* (2013.01); *A01G 3/08* (2013.01); *A23N 15/00* (2013.01); *B26D 1/02* (2013.01);
(Continued)

(58) Field of Classification Search
CPC .......... Y10T 83/95; F16M 1/00; F16M 1/026; F16M 1/04; A23N 15/00; B26D 1/02;
(Continued)

(56) References Cited

U.S. PATENT DOCUMENTS

| 4,243,082 A * | 1/1981 | Paris, Jr. | ............... B23D 45/022 |
| | | | 144/133.1 |
| 2005/0039591 A1* | 2/2005 | Yu | ........................ B23D 45/067 |
| | | | 83/863 |

(Continued)

FOREIGN PATENT DOCUMENTS

| GB | 1130232 | 10/1968 |
| JP | 06-7836 | 2/1994 |
| JP | 2010-133172 | 6/2010 |

*Primary Examiner* — Phong H Nguyen
(74) *Attorney, Agent, or Firm* — Davis, Malm & D'Agostine, P.C.; Richard L. Sampson

(57) ABSTRACT

A removable motor housing for a plant material trimming device. The removable housing may include a first motor housing connectable to the plant trimming device. The first motor housing may be slidably or pivotably connectable to the plant trimming device. The first motor housing may be operable to receive an output shaft from a first motor in the first housing. The output shaft may be operable to communicate with an input shaft of the plant trimming device. A biasing device may be connectable to the first motor housing and the plant trimming device for biasing the first motor housing into a first position. When the first motor housing is in the first position a substantially constant force is applied between the input shaft of the plant trimming device and the output shaft of the first motor.

10 Claims, 9 Drawing Sheets

(51) Int. Cl.
*B26D 1/02* (2006.01)
*B26D 1/36* (2006.01)
*A23N 15/00* (2006.01)
*A01G 3/08* (2006.01)
*A01G 3/04* (2006.01)

(52) U.S. Cl.
CPC .............. *B26D 1/36* (2013.01); *B26D 7/0641* (2013.01); *B26D 7/0691* (2013.01); *A01G 3/0435* (2013.01); *Y10T 83/95* (2015.04)

(58) Field of Classification Search
CPC ...... B26D 1/36; B26D 7/0641; B26D 7/0691; A01G 3/0435; A01G 3/00; A01G 3/08; A01D 46/005
See application file for complete search history.

(56) References Cited

U.S. PATENT DOCUMENTS

| | | | |
|---|---|---|---|
| 2013/0175372 A1* | 7/2013 | Mosman | B02C 18/16 241/25 |
| 2014/0087794 A1* | 3/2014 | Hall | A23N 15/02 460/123 |
| 2014/0196587 A1* | 7/2014 | Beyerlein | B26D 1/36 83/312 |

* cited by examiner

REMOVABLE MOTOR HOUSING FOR A PLANT MATERIAL TRIMMING DEVICE

RELATED APPLICATION

This application claims priority, and is a divisional of co-pending U.S. patent application Ser. No. 14/438,422, entitled REMOVABLE MOTOR HOUSING FOR A PLANT MATERIAL TRIMMING DEVICE, filed on Apr. 24, 2015, the contents of which are incorporated herein by reference in their entirety for all purposes.

FIELD OF THE INVENTION

The invention relates to the field of plant trimming devices, and in particular, to a removable motor housing for a plant mater trimming device.

BACKGROUND OF THE INVENTION

Plant trimming devices have been in operation for some time. Generally, these devices incorporate a fixed blade mechanism for trimming away plant material rotated in an adjacent tumbler. Additionally, these devices incorporate a fixed motor housing that houses a motor(s) that run the device. As conventional motor housings are fixed to plant trimming devices, the motors are fixed in location relative to the tumbler and blade mechanisms. Over time and use, contact points between the motors, tumblers and blade devices become worn, necessitating constant maintenance and replacement of parts such as belts and drive wheels. Furthermore in operation, belts lose their tension and drive wheels lose their contact points which causes inefficiencies in the operation of the plant trimming devices. Accordingly, a need exists for a removable motor housing that is easy to remove and self corrects the motor(s) position within the plant trimming device. Other objects of the invention will be apparent from the description that follows.

SUMMARY OF THE INVENTION

According to the present invention there is provided a removable motor housing for a plant material trimming device. The plant trimming device has an input shaft in communication therewith. The removable housing includes a first motor housing connectable to the plant trimming device. The first motor housing may be slidably or pivotably connectable to the plant trimming device. The first motor housing may be operable to receive an output shaft from a first motor in the first housing. The output shaft may be operable to communicate with the input shaft of the plant trimming device. A biasing device may be connectable to the first motor housing and the plant trimming device for biasing the first motor housing into a first position. When the first motor housing is in the first position a substantially constant force is applied between the input shaft of the plant trimming device and the output shaft of the first motor.

The input shaft and the output shaft may be in direct mechanical communication with one-another, in which case, the constant force is a compressive force across gears, rollers or the like. Alternatively, the input shaft and the output shaft may be in indirect mechanical communication with one-another, for example, via a tensile force across a belt, cable, chain or the like.

The biasing device may be a nut and bolt, a spring, a bungee cord, a hydraulic cylinder, clamping device, or the like.

In accordance with another aspect of the present invention there is provided a removable motor housing for a plant material trimming device. The plant trimming device has a tumbler and an input shaft in communication with the plant trimming device. The removable housing includes a first motor housing connectable to the plant trimming device. The first motor housing may be operable to receive an output shaft from a first motor in the first housing. The first output shaft may be operable to communicate with the input shaft of the plant trimming device. A second motor housing may be connectable to the first motor housing and it may be operable to receive an output shaft from a second motor in the second housing. The second output shaft may be operable to communicate with the tumbler.

A first biasing device may be connectable to the first motor housing and the plant trimming device for biasing the first motor housing into a first position. When the first motor housing is in the first position a substantially constant force is applied between the input shaft of the plant trimming device and the output shaft of the first motor.

A second biasing device may be connectable to the second motor housing and the plant trimming device for biasing the second motor housing into a second position. When the second motor housing is in the second position a substantially constant force is applied between the tumbler and the output shaft of the second motor.

The first and second motor housings may be slidably or pivotably connectable to the plant trimming device. Additionally, the first and second motor housings may be pivotably connectable to one-another.

The input shaft and the first output shaft may be in direct mechanical communication with one-another, in which case, the constant force is a compressive force across gears, rollers or the like. The tumbler and the second output shaft may also be in direct mechanical communication with one-another in which case, the constant force is also a compressive force across gears, rollers or the like.

Alternatively, the input shaft and the first output shaft may be in indirect mechanical communication with one-another, for example, via a tensile force across a belt, cable, chain or the like. Similarly, the tumbler and the second output shaft may be in indirect mechanical communication with one-another, for example, via a tensile force across a belt, cable, chain or the like.

The first and second biasing devices may be a nut and bolt, a spring, a bungee cord, a hydraulic cylinder, clamping device, or the like.

In accordance with yet another aspect of the present invention there is provided a removable motor housing for a plant material trimming device. The plant trimming device has a tumbler and an input shaft in communication with the plant trimming device. The removable housing includes a first motor housing connectable to the plant trimming device which is operable to receive an output shaft from a first motor in the first housing. The first output shaft may be operable to communicate with the input shaft of the plant trimming device. A second motor housing may be connectable to the first motor housing and it may be operable to receive an output shaft from a second motor in the second housing. The second output shaft may be operable to communicate with the tumbler A biasing device may be connectable to the first and second motor housings for biasing the first motor housing into a first position and biasing the second motor housing into a second position. When the first motor housing is in the first position a substantially constant force is applied between the input shaft of the plant trimming device and the output shaft of the first motor and when the second motor housing is in the second position a substantially constant force is applied between the tumbler and the output shaft of the second motor.

The first and second motor housings may be slidably or pivotably connectable to the plant trimming device. Additionally, the first and second motor housings may be pivotably connectable to one-another.

The input shaft and the first output shaft may be in direct mechanical communication with one-another, in which case, the constant force is a compressive force across gears, roller or the like. The tumbler and the second output shaft may also be in direct mechanical communication with one-another, in which case, the constant force is also a compressive force across gears, roller or the like.

The input shaft and the first output shaft may be in indirect mechanical communication with one-another while the tumbler and the second output shaft may be in direct mechanical communication with one-another. Here, the constant force across the input shaft and first output shaft is a tensile force via a belt, cable, chain or the like and the constant force across the tumbler and the second output shaft is a compressive force across gears, roller or the like.

The input shaft and the first output shaft may be in direct mechanical communication with one-another while the tumbler and the second output shaft may be in indirect mechanical communication with one-another. Here, the constant force across the input shaft and first output shaft is a compressive force across gears, roller or the like and the constant force across the tumbler and the second output shaft is a tensile force via a belt, cable, chain or the like.

The input shaft and the first output shaft may be in indirect mechanical communication with one-another while the tumbler and the second output shaft may also be in indirect mechanical communication with one-another. The indirect mechanical communication may occur via a tensile force across a belt, cable, chain or the like.

The biasing device may be a hydraulic cylinder or spring connectable to the first and second motor housings.

Other aspects of the invention will be appreciated by reference to the detailed description of the preferred embodiment and to the claims that follow.

BRIEF DESCRIPTION OF THE DRAWINGS

The preferred embodiment of the invention will be described by reference to the drawings thereof in which.

DESCRIPTION OF THE PREFERRED
EMBODIMENT OF THE INVENTION

Figure 1:
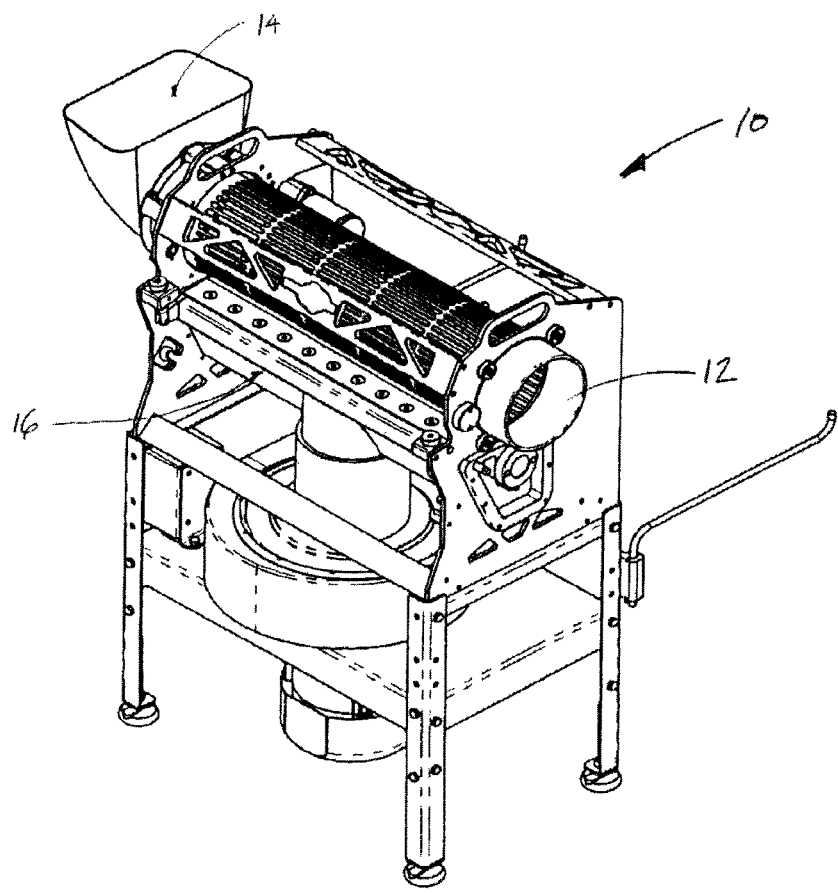
FIG. 1 is perspective view of a plant material trimming device.
Figure 2:
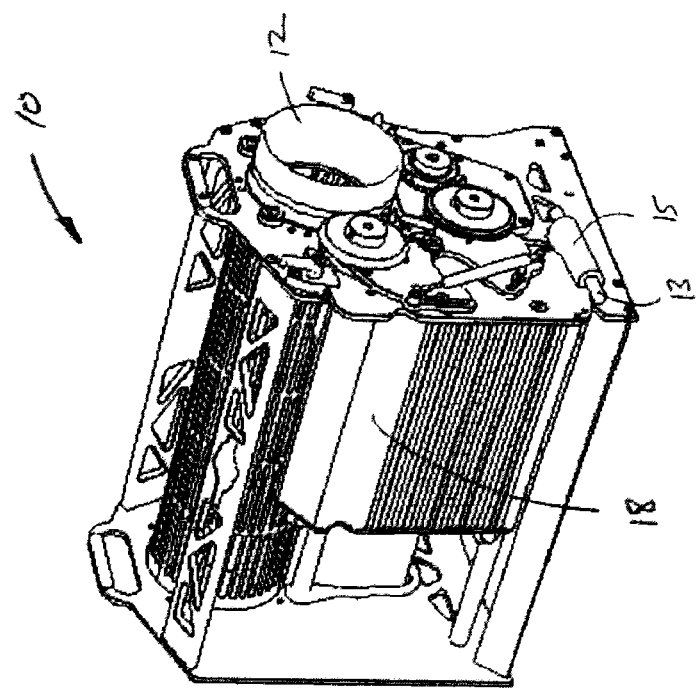
FIG. 2 is a reverse perspective view of the plant material trimming device of FIG. 1 showing a removable motor housing inside the plant material trimming device.

Referring to FIG. 1, a plant material trimming device 10 is depicted. The device 10 includes a tumbler 12 residing inside of the device. Plant material that requires trimming is inserted into a hopper 14 which then feeds the plant material into the tumbler 12. A removable blade mechanism 16 is situated inside of the device 10 and adjacent the tumbler 12. As the plant material is tumbled in the tumbler 12, the blade mechanism 16 cuts the plant material in a scissor-like fashion as the plant material is exposed between the blade mechanism and tumbler walls. Referring to FIG. 2, a removable motor housing 18 is also situated inside the device 10 and adjacent the tumbler 12.

Figure 3:
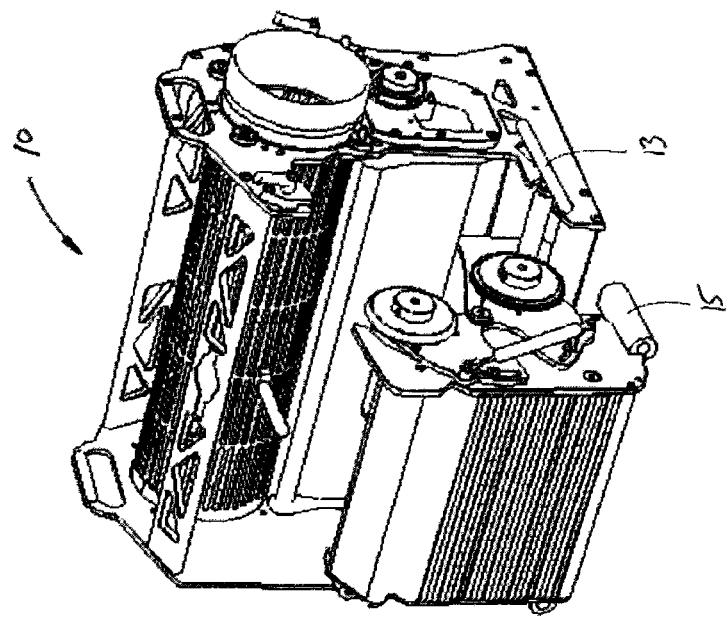
FIG. 3 is a reverse perspective view of the plant material trimming device of FIG. 1 showing a removable motor housing removed from the plant material trimming device.
Figure 4:
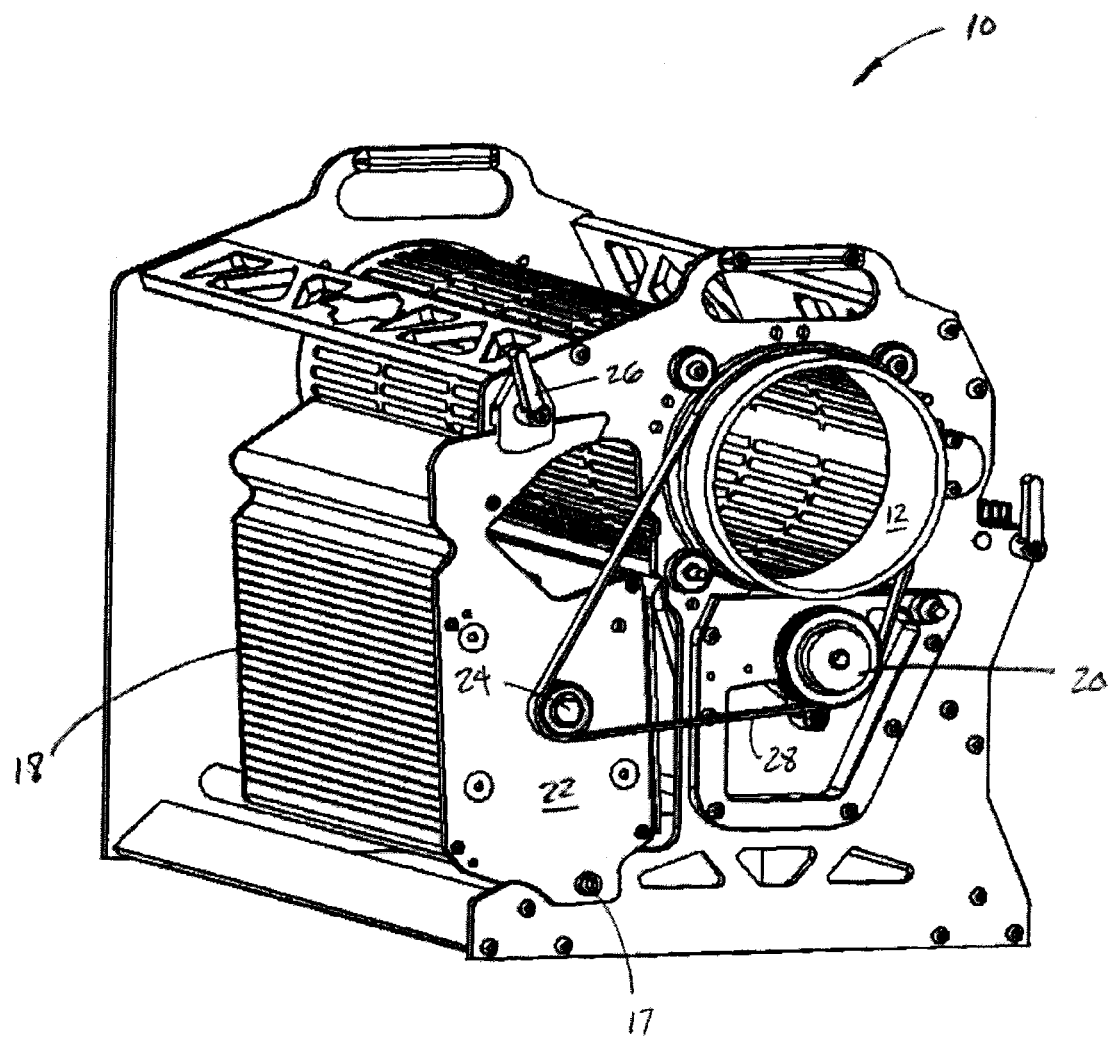
FIG. 4 is a perspective view of an embodiment of the removable motor housing inside the plant material trimming system.

Referring to FIG. 4, the plant trimming device 10 has an input shaft 20 in communication therewith. The removable housing 18 includes a first motor housing 22 connectable to the plant trimming device. As depicted in FIGS. 2 and 3, the first motor housing may be slidably connected to the plant trimming device 10. Here, the plant trimming device has rails 13 for which runners 15 of the first motor housing 18 may slidably engage. Referring back to FIG. 4, alternatively, the first motor housing may be pivotably connectable via a pin 17 to the plant trimming device 10. The first motor housing 22 is operable to receive an output shaft 24 from a first motor (not depicted) in the first housing 22. The output shaft 24 is operable to communicate with the input shaft 20 of the plant trimming device. A biasing device is connectable to the first motor housing 22 and the plant trimming device 10 for biasing the first motor housing into a first position. As depicted, the biasing device is a clamping device 26, but as those skilled in the art will appreciate, the biasing device may also be a nut and bolt, a spring, a bungee cord, a hydraulic cylinder, or the like.

When the first motor housing 22 is in the first position a substantially constant force is applied between the input shaft 20 of the plant trimming device 10 and the output shaft 24 of the first motor. The input shaft 20 and the output shaft 24 may be in direct mechanical communication with one-another, in which case, the constant force is a compressive force across gears, roller or the like. Alternatively, and as depicted, the input shaft 20 and the output shaft 24 may be in indirect mechanical communication with one-another, for example, via a tensile force across a belt 28 cable, chain or the like. Here, the first motor of the first motor housing 22 drives the output shaft 24, which in turns, drives both the input shaft 20 and the tumbler 12 via belt 28.

Figure 5:
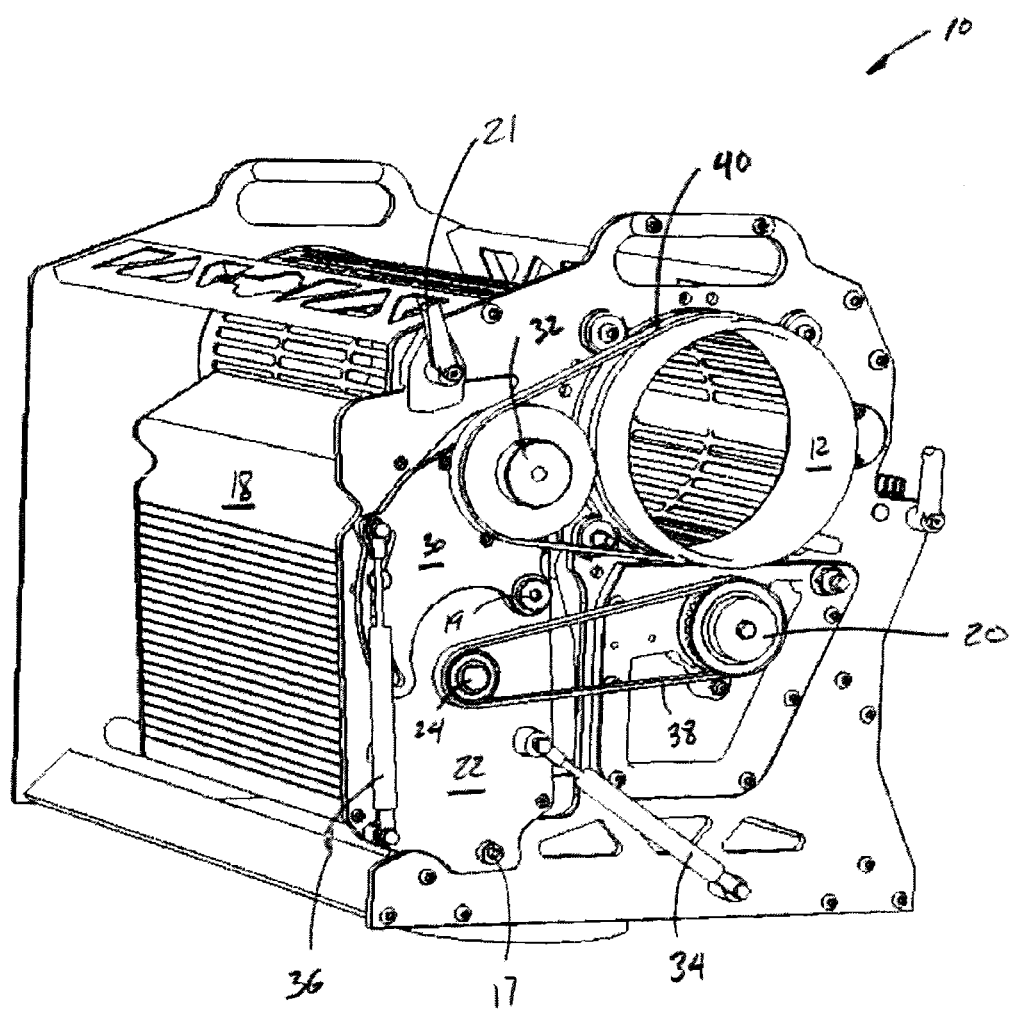
FIG. 5 is a perspective view of another embodiment of the removable motor housing inside the plant material trimming system.

In another embodiment, as depicted in FIG. 5, a second motor housing 30 is pivotably connectable to the first motor housing 22 via a pin 19 and is operable to receive an output shaft 32 from a second motor (not depicted) in the second housing. This second output shaft 32 is operable to communicate with the tumbler 12. Here, a first self-biasing device 34 (such as a spring, bungee cord, hydraulic cylinder, or the like) is connectable to the first motor housing 22 and the plant trimming device 10 for biasing the first motor housing into a first position. When the first motor housing 22 is in the first position a substantially constant force is applied between the input shaft 20 of the plant trimming device 10 and the output shaft 24 of the first motor from the first housing 22. A second self-biasing device 36 (such as a nut and bolt, spring, bungee cord, hydraulic cylinder, clamping device, or the like) is also connectable to the second motor housing 30 and the plant trimming device 10 or first motor housing 22 (as depicted) for biasing the second motor housing into a second position. When the second motor housing 30 is in the second position a substantially constant force is applied between the tumbler 12 and the output shaft 32 of the second motor of the second motor housing 30.

The input shaft 20 and the first output shaft 24 may be in direct mechanical communication with one-another, in which case, the constant force is a compressive force across gears, rollers or the like. The tumbler 12 and the second output shaft 32 may also be in direct mechanical communication with one-another in which case, the constant force is also a compressive force. Alternatively, and as depicted the input shaft 20 and the first output shaft 24 may be in indirect mechanical communication with one-another, for example, via a tensile force across a belt 38 cable, chain or the like. Similarly, the tumbler 12 and the second output shaft 32 may be in indirect mechanical communication with one-another, for example, via a tensile force across another belt 40 cable, chain or the like. Here, the first motor of the first motor housing 22 drives the output shaft 24, which in turns, drives the input shaft 20 via belt 38. Additionally, the second motor of the second motor housing 30 drives the output shaft 32 and the tumbler 12 via belt 40. A locking device 21 may be incorporated to lock the removable motor housing 18 to the plant trimming device 10.

FIGS. 6, 7a, 7b, 8 and 9 depict another embodiment of the present invention. As before, the invention includes a removable motor housing 18 for a plant material trimming device 10. As depicted, the removable housing 18 may be pivotably connectable via pin 17 to the plant trimming device 10. The removable housing 18 may alternatively be slidably connectable to the plant trimming device in the same fashion as depicted in FIGS. 2 and 3. Referring back to FIGS. 6, 7a, 7b, 8 and 9, the plant trimming device 10 has a tumbler 12 and an input shaft 20 in communication with the plant trimming device. The removable housing 18 includes a pivotably connectable first motor housing 22 and a pivotably connectable second motor housing 30, each connectable to one-another via pin 50. The first motor housing 22 is operable to receive an output shaft 24 from a first motor (not depicted) which is operable to communicate with the input shaft 20 of the plant trimming device 10. The second motor housing 30 is operable to receive an output shaft 32 from a second motor (not depicted) which is operable to communicate with the tumbler 12.

A self-biasing device 40 (such as a spring, bungee cord, hydraulic cylinder, or the like) is connectable to both the first 22 and second 30 motor housings for biasing the first motor housing into a first position and biasing the second motor housing into a second position. The first motor housing 22 is in the first position a substantially constant force is applied between the input shaft 20 and the output shaft 24 and when the second motor housing 30 is in the second position a substantially constant force is applied between the tumbler 12 and the output shaft 32.

Figure 6:
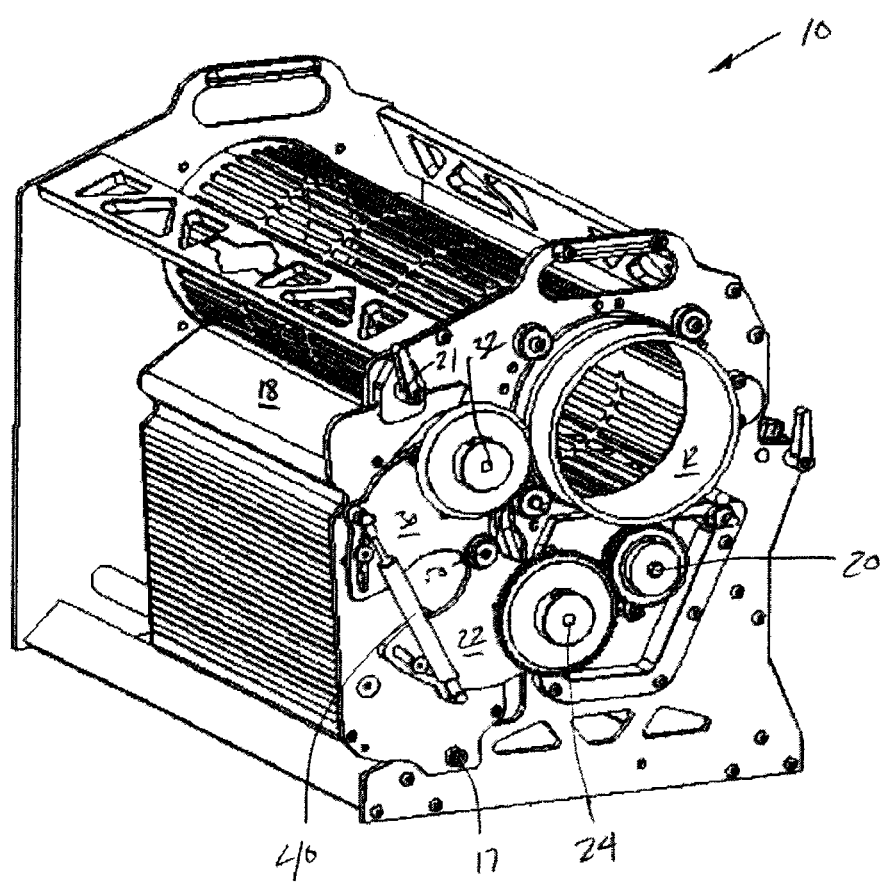
FIG. 6 is a perspective view of another embodiment of the removable motor housing inside the plant material trimming system.

As depicted in FIG. 6, when the input shaft 20 and the first output shaft 24 are in direct mechanical communication with one-another across gears, rollers (as depicted) or the like, a constant compressive force is applied there between. Similarly, when the tumbler 12 and the second output shaft 32 are in direct mechanical communication with one-another across gears, rollers (as depicted) or the like, a constant compressive force is also applied there between. Here, self-biasing device 40 may be a hydraulic cylinder or the like that forces first 22 and second 30 motor housings away from each other at their respective connection points. Once the first 22 and second 30 motor housings are located in their respective positions so that the constant forces are applied between the first output shaft 24 and input shaft 20 and second output shaft 32 and tumbler 12, a locking device 21 may be incorporated to lock the removable motor housing 18 to the plant trimming device 10.

Figure 7A:
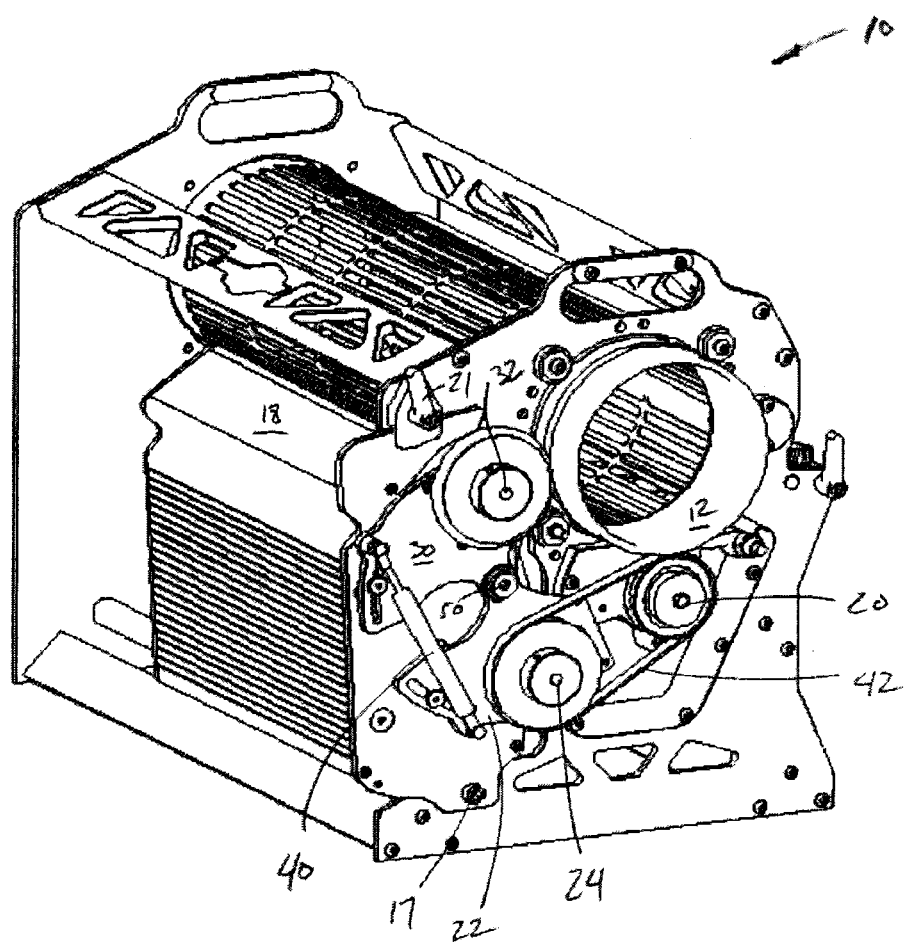
FIG. 7a is a perspective view of the removable motor housing inside the plant material trimming system of FIG. 6 in another configuration.

As depicted in FIG. 7a, when the input shaft 20 and the first output shaft 24 are in indirect mechanical communication with one-another, a constant tensile force is applied there between via a belt 42, cable, chain or the like. On the other hand, when the tumbler 12 and the second output shaft 32 are in direct mechanical communication with one-another across gears, rollers (as depicted) or the like, a constant compressive force is applied there between. Here, self-biasing device 40 may be a hydraulic cylinder or the like that forces the second 30 motor housing toward the tumbler 12 and the first motor housing 22 away from the input shaft 20. Here, first motor housing 22 may be locked from pivoting about pin 50. Furthermore, once the first 22 and second 30 motor housings are located in their respective positions so that the constant forces are applied between the first output shaft 24 and input shaft 20 and second output shaft 32 and tumbler 12, a locking device 21 may be incorporated to lock the removable motor housing 18 to the plant trimming device 10.

Figure 7B:
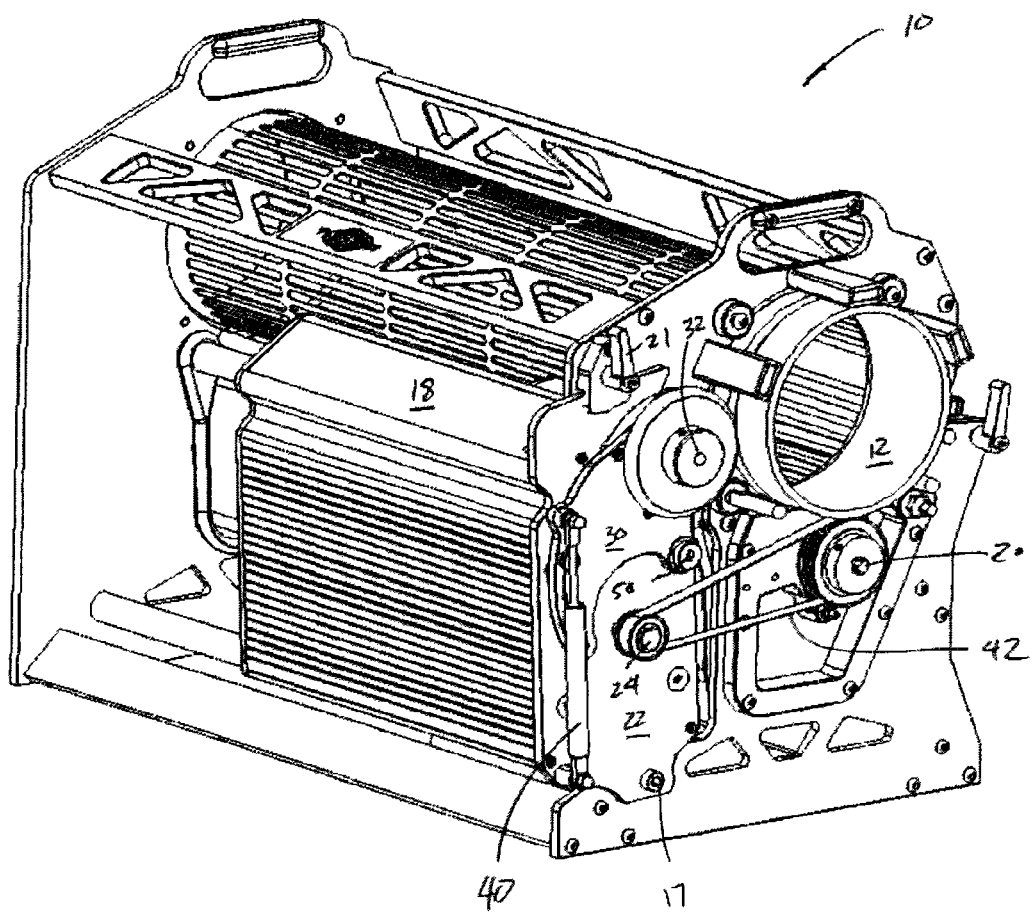
FIG. 7b is a perspective view of the removable motor housing inside the plant material trimming system of FIG. 6 in another configuration.

As depicted in FIG. 7b, when the input shaft 20 and the first output shaft 24 are in indirect mechanical communication with one-another, a constant tensile force is applied there between via a belt 42, cable, chain or the like. On the other hand, when the tumbler 12 and the second output shaft 32 are in direct mechanical communication with one-another across gears, rollers (as depicted) or the like, a constant compressive force is applied there between. Here, self-biasing device 40 may be a hydraulic cylinder or the like that forces the second 30 motor housing toward the tumbler 12 when first motor housing 22 is pulled away from the input shaft 20. Furthermore, once the first 22 and second 30 motor housings are located in their respective positions so that the constant forces are applied between the first output shaft 24 and input shaft 20 and second output shaft 32 and tumbler 12, a locking device 21 may be incorporated to lock the removable motor housing 18 to the plant trimming device 10.

Figure 8:
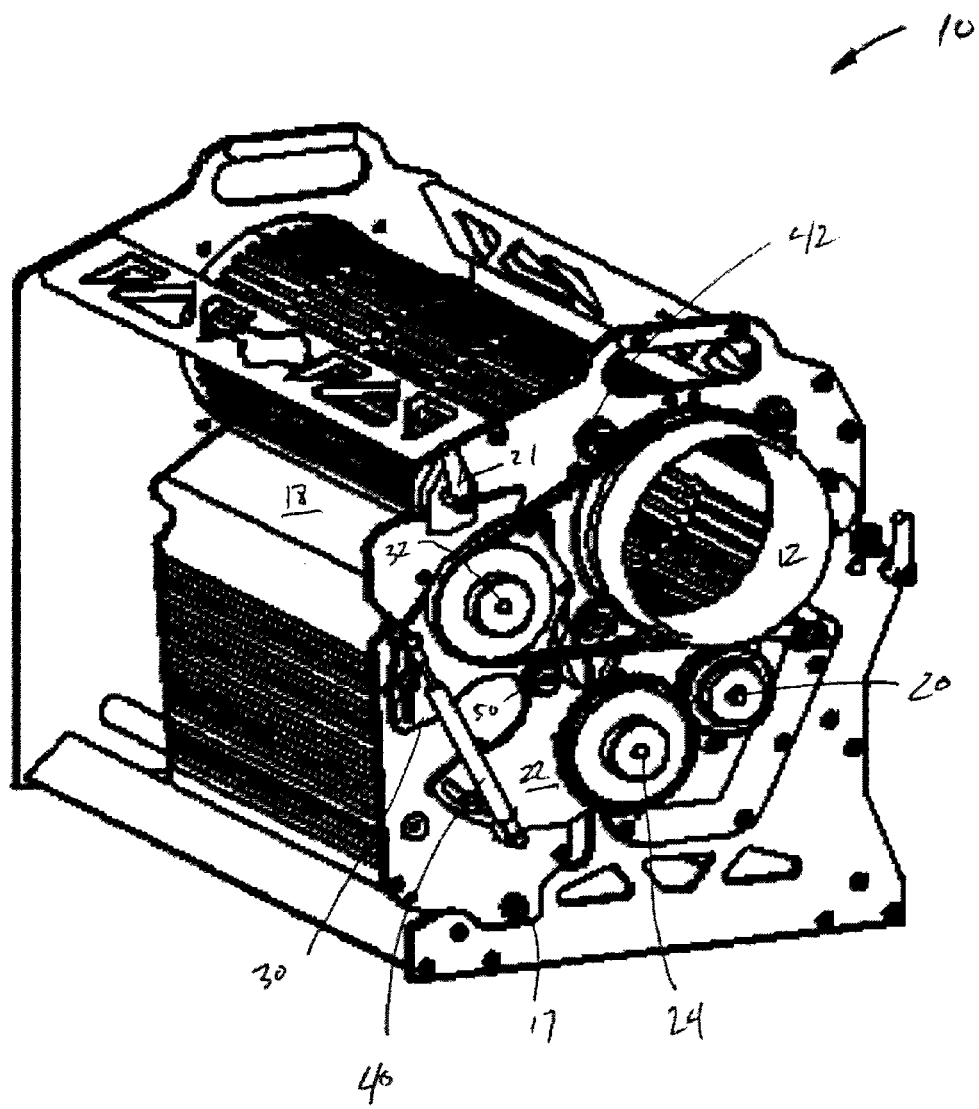
FIG. 8 is a perspective view of the removable motor housing inside the plant material trimming system of FIG. 6 in another configuration.

As depicted in FIG. 8, when the input shaft 20 and the first output shaft 24 are in direct mechanical communication with one-another, across gears, rollers (as depicted) or the like, a constant compressive force applied there between. On the other hand, when the tumbler 12 and the second output shaft 32 are in indirect mechanical communication with one-another, a constant compressive tensile force applied there between via a belt 42, cable, chain or the like. Here, self-biasing device 40 may be a hydraulic cylinder or the like that forces the second 30 motor housing away from the tumbler 12 and the first motor housing 22 towards the input shaft 20. Here, second motor housing 30 may be locked from pivoting about pin 50. Furthermore, once the first 22 and second 30 motor housings are located in their respective positions so that the constant forces are applied between the first output shaft 24 and input shaft 20 and second output shaft 32 and tumbler 12, a locking device 21 may be incorporated to lock the removable motor housing 18 to the plant trimming device 10.

Figure 9:
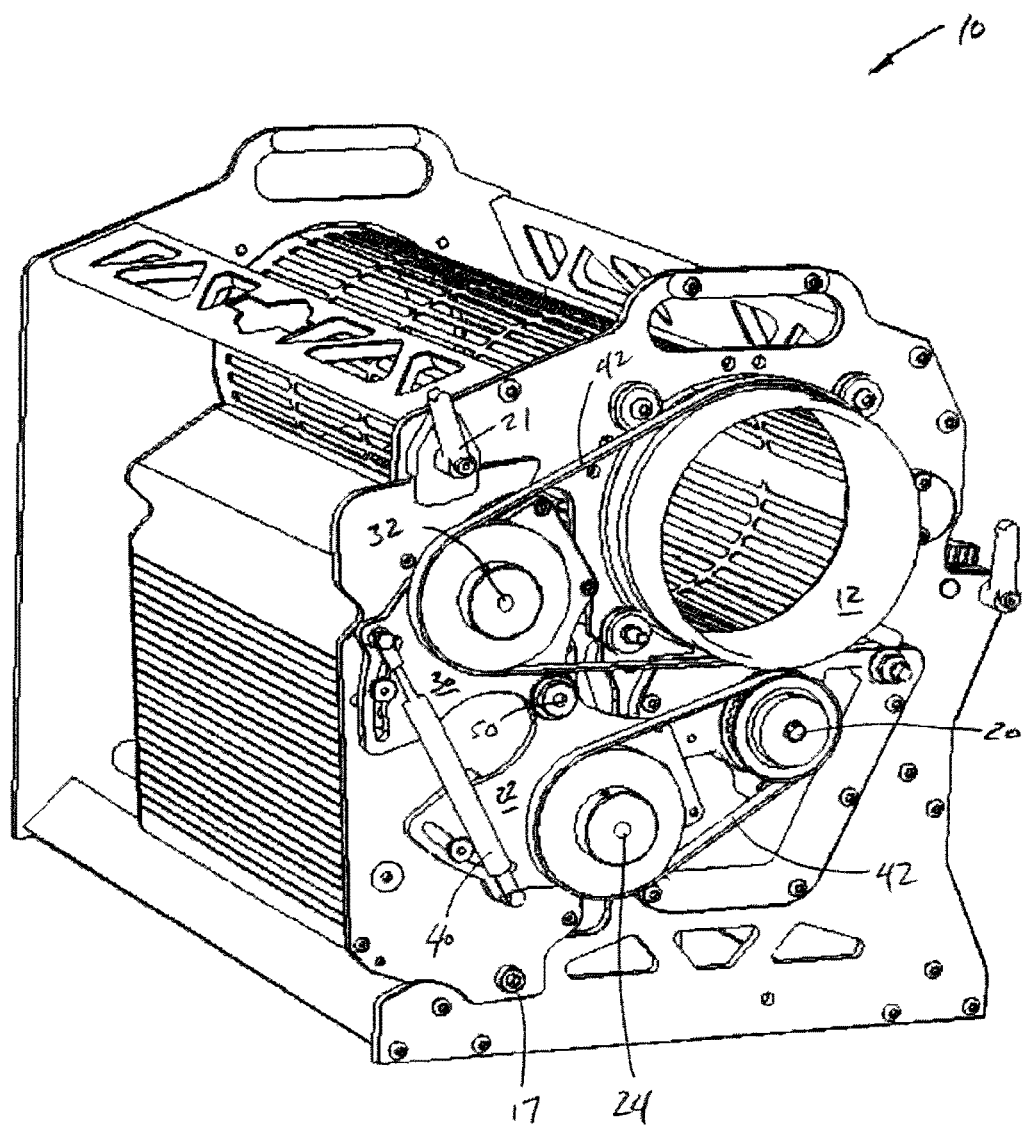
FIG. 9 is a perspective view of the removable motor housing inside the plant material trimming system of FIG. 6 in another configuration.

As depicted in FIG. 9, when the input shaft 20 and the first output shaft 24 are in indirect mechanical communication with one-another, a constant tensile force is applied there between via a belt 42, cable, chain or the like. Similarly, when the tumbler 12 and the second output shaft 32 are in indirect mechanical communication with one-another, a constant tensile force is applied there between via another belt 42, cable, chain or the like. Here, self-biasing device 40 may be a hydraulic cylinder or the like that forces first 22 and second 30 motor housings towards each other at their respective connection points. Once the first 22 and second 30 motor housings are located in their respective positions so that the constant forces are applied between the first output shaft 24 and input shaft 20 and second output shaft 32 and tumbler 12, a locking device 21 may be incorporated to lock the removable motor housing 18 to the plant trimming device 10.

It will thus be seen that a new and removable motor housing for a plant material trimming device has been illustrated and described and it will be apparent to those skilled in the art that the preferred and alternative embodiments have been described in some detail but that certain modifications may be practiced without departing from the principles of the invention.

What is claimed is:

1. A removable motor housing for a plant material trimming device, the plant trimming device having an input shaft in communication therewith, the removable housing comprising:
    a first motor housing connectable to the plant trimming device, said first motor housing operable to receive an output shaft from a first motor in said first housing, said output shaft operable to communicate with the input shaft of the plant trimming device; and
    a second motor housing connectable to said first motor housing, said second motor housing operable to receive an output shaft from a second motor in said second housing, said second output shaft operable to communicate with a tumbler;
    first biasing means connectable to said first motor housing and the plant trimming device for biasing said first motor housing into a first position wherein when said first motor housing is in said first position a substantially constant force is applied between the input shaft of the plant trimming device and the output shaft of said first motor; and
    second biasing means connectable to said second motor housing and the plant trimming device for biasing said second motor housing into a second position wherein when said second motor housing is in said second position a substantially constant force is applied between the tumbler and the output shaft of said second motor.

2. The removable housing of claim 1 wherein said first motor housing is slidably connectable to the plant trimming device.

3. The removable housing of claim 1 wherein said first motor housing is pivotably connectable to the plant trimming device.

4. The removable housing of claim 1 wherein said second motor housing is slidably connectable to the plant trimming device.

5. The removable housing of claim 1 wherein said second motor housing is pivotably connectable to the plant trimming device.

6. The removable housing of claim 1 wherein said first and second motor housings are pivotably connectable to one-another.

7. The removable housing of claim 1 wherein the input shaft and said first output shaft are in direct mechanical communication with one another.

8. The removable housing of claim 1 wherein the tumbler and said second output shaft are in direct mechanical communication with one another.

9. The removable housing of claim 1 wherein the input shaft and said first output shaft are in indirect mechanical communication with one another.

10. The removable housing of claim 1 wherein the tumbler and said second output shaft are in indirect mechanical communication with one another.

* * * * *